US 6,412,047 B2

(12) United States Patent
Shimizu et al.

(10) Patent No.: US 6,412,047 B2
(45) Date of Patent: *Jun. 25, 2002

(54) COHERENCY PROTOCOL (75) Inventors: D. Shimizu, Palo Alto, CA (US); Andrew Jones, Bristol (GB)

(73) Assignee: STMicroelectronics, Inc., Carrollton, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/411,453
(22) Filed: Oct. 1, 1999

Related U.S. Application Data (63) Continuation of application No. 09/411,453, filed on Oct. 1, 1999.

(51) Int. Cl.⁷ .............................................. G06F 12/00
(52) U.S. Cl. ........................ 711/141; 711/147; 711/159
(58) Field of Search ................................. 711/141, 146, 711/147, 159, 129, 133

(56) References Cited

U.S. PATENT DOCUMENTS

| 4,814,981 A |   | 3/1989 | Rubinfeld .................... 364/200 |
| 4,905,141 A | * | 2/1990 | Brenza ........................ 364/200 |
| 5,251,311 A |   | 10/1993 | Kasai .......................... 395/425 |
| 5,386,565 A |   | 1/1995 | Tanaka et al. ............... 395/700 |
| 5,423,050 A |   | 6/1995 | Taylor et al. ................ 395/575 |
| 5,432,918 A | * | 7/1995 | Stamm ........................ 710/112 |
| 5,434,804 A |   | 7/1995 | Bock et al. .................. 364/579 |
| 5,440,705 A |   | 8/1995 | Wang et al. ............. 395/421.1 |
| 5,448,576 A |   | 9/1995 | Russell ...................... 371/22.3 |
| 5,452,432 A |   | 9/1995 | Macachor ................... 395/425 |
| 5,455,936 A |   | 10/1995 | Maemura ............... 395/183.11 |

(List continued on next page.)

FOREIGN PATENT DOCUMENTS

| EP | 0165600 B1 | * | 11/1991 | ........... G06F/13/36 |
| EP | 0636976 A1 |   | 2/1995 | ........... G06F/11/00 |
| EP | 0636976 B1 | * | 2/1995 | ........... G06F/11/00 |
| EP | 0652516 A1 | * | 5/1995 | ........... G06F/11/00 |
| EP | 0702239 A2 | * | 3/1996 | ....... G01R/31/3173 |
| EP | 0720092 A1 | * | 7/1996 | ........... G06F/11/00 |
| EP | 0933926 A1 | * | 8/1999 | ........... H04N/5/00 |
| EP | 0945805 A1 | * | 9/1999 | ........... G06F/12/08 |
| EP | 0959411 A1 | * | 11/1999 | ........... G06F/13/24 |
| JP | PCT/JP96/02819 |   | 9/1996 | ............. G06F/9/46 |
| JP | 8320796 A | * | 12/1996 | ............. G06F/9/46 |
| JP | 8329687 A | * | 12/1996 | ........... G11C/15/00 |
| JP | 9212358 A | * | 8/1997 | ............. G06F/9/38 |
| JP | 9311786 A |   | 12/1997 | ............. G06F/9/38 |
| JP | 10106269 A |   | 4/1998 | ........... G06F/12/08 |
| JP | 10124484 A |   | 5/1998 | ........... G06F/17/10 |
| JP | 10177520 A |   | 6/1998 | ........... G06F/12/10 |
| WO | WO98/13759 | * | 4/1998 | ............. G06F/9/46 |

OTHER PUBLICATIONS

York et al, "Real Time Debug for System–on–Chip Devices", ARM Ltd, Cambridge, UK, pp. 1–6, Jun. 1999.*

*Primary Examiner*—Matthew Kim
*Assistant Examiner*—Stephen Elmore
(74) *Attorney, Agent, or Firm*—Lisa K. Jorgenson; William J. Kubida (57) ABSTRACT

A computer system having a memory system where at least some of the memory is designated as shared memory. A transaction-based bus mechanism couples to the memory system and includes a cache coherency transaction defined within its transaction set. A processor having a cache memory is coupled to the memory system through the transaction based bus mechanism. A system component coupled to the bus mechanism includes logic for specifying cache coherency policy. Logic within the system component initiates a cache transaction according to the specified cache policy on the bus mechanism. Logic within the processor responds to the initiated cache transaction by executing a cache operation specified by the cache transaction.

19 Claims, 5 Drawing Sheets

U.S. PATENT DOCUMENTS

| | | | | |
|---|---|---|---|---|
| 5,479,652 A | | 12/1995 | Dreyer et al. | 395/183.06 |
| 5,483,518 A | | 1/1996 | Whetsel | 370/13 |
| 5,488,688 A | | 1/1996 | Gonzales et al. | 395/183.1 |
| 5,519,846 A | * | 5/1996 | Swenson | 711/130 |
| 5,524,212 A | * | 6/1996 | Somani et al. | 395/200.08 |
| 5,530,965 A | | 6/1996 | Kawasaki et al. | 395/800 |
| 5,537,635 A | * | 7/1996 | Douglas | 395/456 |
| 5,570,375 A | | 10/1996 | Tsai et al. | 371/22.3 |
| 5,577,226 A | * | 11/1996 | Percival | 395/446 |
| 5,590,354 A | | 12/1996 | Klapproth et al. | 395/800 |
| 5,596,734 A | | 1/1997 | Ferra | 395/825 |
| 5,598,551 A | | 1/1997 | Barajas et al. | 395/484 |
| 5,608,881 A | | 3/1997 | Masumura et al. | 395/306 |
| 5,613,153 A | | 3/1997 | Arimilli et al. | 395/821 |
| 5,627,842 A | | 5/1997 | Brown et al. | 371/22.3 |
| 5,657,273 A | | 8/1997 | Ayukawa et al. | 395/189.01 |
| 5,680,571 A | * | 10/1997 | Bauman | 395/449 |
| 5,682,545 A | | 10/1997 | Kawasaki et al. | 395/800 |
| 5,704,034 A | | 12/1997 | Circello | 395/183.14 |
| 5,708,773 A | | 1/1998 | Jeppesen, III et al. | 395/183.06 |
| 5,724,549 A | | 3/1998 | Selgas et al. | 395/468 |
| 5,737,516 A | | 4/1998 | Circello et al. | 395/183.14 |
| 5,751,621 A | | 5/1998 | Arakawa | 364/748.07 |
| 5,768,152 A | | 6/1998 | Battaline et al. | 364/551.01 |
| 5,771,240 A | | 6/1998 | Tobin et al. | 371/22.1 |
| 5,774,701 A | | 6/1998 | Matsui et al. | 395/556 |
| 5,778,237 A | | 7/1998 | Yamamoto et al. | 395/750.04 |
| 5,781,558 A | | 7/1998 | Inglis et al. | 371/21.1 |
| 5,796,978 A | | 8/1998 | Yoshioka et al. | 395/416 |
| 5,828,825 A | | 10/1998 | Eskandari et al. | 395/183.03 |
| 5,832,248 A | | 11/1998 | Kishi et al. | 395/376 |
| 5,835,963 A | | 11/1998 | Yoshioka et al. | 711/207 |
| 5,848,247 A | | 12/1998 | Matsui et al. | 395/284 |
| 5,860,127 A | | 1/1999 | Shimazaki et al. | 711/167 |
| 5,862,387 A | | 1/1999 | Songer et al. | 395/728 |
| 5,867,726 A | | 2/1999 | Ohsuga et al. | 395/800.32 |
| 5,875,464 A | * | 2/1999 | Kirk | 711/129 |
| 5,875,465 A | * | 2/1999 | Kilpatrick et al. | 711/134 |
| 5,884,092 A | | 3/1999 | Kiuchi et al. | 395/800.35 |
| 5,896,550 A | | 4/1999 | Wehunt et al. | 395/846 |
| 5,918,045 A | | 6/1999 | Nishii et al. | 395/584 |
| 5,930,523 A | | 7/1999 | Kawasaki et al. | 395/800.32 |
| 5,930,833 A | | 7/1999 | Yoshioka et al. | 711/210 |
| 5,944,841 A | | 8/1999 | Christie | 714/38 |
| 5,950,012 A | | 9/1999 | Shiell et al. | 395/712 |
| 5,953,538 A | | 9/1999 | Duncan et al. | 395/842 |
| 5,956,477 A | | 9/1999 | Ranson et al. | 395/183.06 |
| 5,978,874 A | | 11/1999 | Singhal et al. | 710/107 |
| 5,978,902 A | | 11/1999 | Mann | 712/227 |
| 5,983,017 A | | 11/1999 | Kemp et al. | 395/704 |
| 5,983,379 A | | 11/1999 | Warren | 714/727 |
| 5,987,571 A | * | 11/1999 | Shibata et al. | 711/137 |
| 6,088,770 A | * | 7/2000 | Tarui et al. | 711/148 |
| 6,122,691 A | * | 9/2000 | Arimilli et al. | 710/105 |
| 6,292,705 B1 | * | 9/2001 | Wang et al. | 700/5 |

* cited by examiner

COHERENCY PROTOCOL

This application is a con of 09/411,453 filed Oct. 1, 1999.

BACKGROUND OF THE INVENTION

1. Field of the Invention

The present invention relates in general to microprocessor systems and, more particularly, to a system, method, and mechanism providing cache coherency in microprocessor systems with cache support.

2. Relevant Background

Microprocessors manipulate data according to instructions specified by a computer program. The instructions and data in a conventional system are stored in main memory which is coupled to the processor by a memory bus. The ability of processors to execute instructions has typically outpaced the ability of memory subsystems to supply instructions and data to the processors. As used herein the terms "microprocessor" and "processor" include complete instruction set computers (CISC), reduced instruction set computers (RISC) and hybrids.

Most processors use a cache memory system to speed memory access. Cache memory comprises one or more levels of dedicated high-speed memory holding recently accessed data and instructions, designed to speed up subsequent access to the same data and instructions. Cache technology is based on a premise that programs frequently re-execute the same instructions and data. Also, instructions and data exhibit a trait called "spatial locality" which means that instructions and data to be used in the future tend to be located in the same general region of memory as recently used instructions and data. When data is read from main system memory, a copy is also saved in the cache memory, along with an index to the associated location in main memory. Often the cache entry includes not only the data specifically requested, but data surrounding the specifically requested data.

The cache then monitors subsequent requests for data to see if the information needed has already been stored in the cache. If the data had indeed been stored in the cache, the data is delivered immediately to the processor while the attempt to fetch the information from main memory is aborted (or not started). If, on the other hand, the data had not been previously stored in cache then it is fetched directly from main memory and also saved in cache for future access.

Microprocessor performance is greatly enhanced by the use of cache memory. Cache memory comprises memory devices that have lower latency than the main memory. In particular, one or more levels of on-chip cache memory provide particularly low-latency storage. On-chip cache memory can be implemented in memory structures and devices having latency of only one or two clock cycles. Cache memory, particularly on-chip cache memory, is particularly suited to being accessed by the microprocessor at high speed.

An task for the cache subsystem is to maintain cache coherency. Cache coherency refers to the task of ensuring that the contents of cache memory are consistent with the corresponding locations in main memory. When only the microprocessor can access main memory cache coherency is a relatively simple task. However, this restriction forces all accesses to main memory to be routed through the microprocessor. Many devices such as graphics modules, mulitimedia modules and network interface modules, for example, can make use of system memory for efficient operation. However, if these modules must tie up the processor in order to use system memory, overall performance is lowered.

To make more efficient use of the processor, many systems allow modules and peripherals other than the microprocessor to access main memory directly. The system bus in a typical computer system architecture couples to the microprocessor and to a direct memory access (DMA) controller. Other modules and peripherals coupled to the bus can access main memory without tying up the microprocessor using the DMA controller. This may also be referred to as a shared memory system as all or part of the main memory is shared amongst the variety or devices, including the microprocessor, that can access the memory.

Shared memory systems complicate the cache coherency task significantly. DMA devices access main memory directly, but usually do not access the cache memory directly. To ensure that the DMA device obtains correct data steps must be taken to verify that the contents of the shared memory location being accessed by a DMA device have not been changed in the cached copy of that location being used by the microprocessor. Moreover, the latency imposed by this coherency check cannot be such as to outweigh the benefits of either caching or direct memory access.

One solution is to partition the main memory into cacheable and uncacheable portions. DMA devices are restricted to using only uncacheable portions of memory. In this manner, the DMA device can be unconcerned with the cache contents. However, for the data stored in the uncacheable portions all of the benefits of cache technology are lost.

Another solution is to enable the DMA controller or other hardware coupled to the system bus to "snoop" the cache before the access to shared memory is allowed. An example of this is in the peripheral component interconnect (PCI) bus that enables the PCI bridge device to snoop the CPU cache automatically as a part of any DMA device transaction. This allows shared memory to be cached, however, also adds latency to every DMA transaction. Systems having a single system bus on which all DMA transactions are performed can implement snooping protocols efficiently. This is because a single bus system enables any device to broadcast a signal to all other devices quickly and efficiently to indicate that a shared memory access is occurring.

However, there is an increasing demand for systems with robust, complex, multi-path communications subsystems for interconnecting system components. Complex communications networks enable greater expansion potential and customization. Moreover, such systems enable existing, proven subsystem and module designs (often referred to as intellectual property or "IP") to be reused. In systems with more complex bus networks that enable multiple independent paths a network broadcast can be slow making conventional snoop protocols impractical.

Another solution used for more complex networks uses a centralized or distributed directory structure to hold cache status information. These may be seen, for example, in multiprocessor architectures. Any device accessing shared memory first accesses the directory to determine whether the target memory address is currently cached. When the address is not cached, a direct access to the shared memory location is made. When the address is cached, the cached data is written back to main memory before the direct access is completed. Directory-based solutions are faster than snoop operations, but also add latency to each DMA access as well as hardware overhead to support the directory structure.

A need exists for a mechanism, method and system that enables efficient shared memory access in a cached memory system. A need specifically exists for a mechanism to perform cache coherency in a system have a complex, multipath system bus.

SUMMARY OF THE INVENTION

The present invention involves a computer system having a memory system where at least some of the memory is designated as shared memory. A transaction-based bus mechanism couples to the memory system and includes a cache coherency transaction defined within its transaction set. A processor having a cache memory is coupled to the memory system through the transaction based bus mechanism. A system component coupled to the bus mechanism includes logic for specifying cache coherency policy. Logic within the system component initiates a cache transaction according to the specified cache policy on the bus mechanism. Logic within the processor responds to the initiated cache transaction by executing a cache operation specified by the cache transaction.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENTS

The preferred implementation of the present invention comprises a system that may be implemented as a single integrated circuit system-on-a-chip solution or as multiple integrated circuits with varying levels of integration. In either case, sub-components of the system are interconnected by a bus network that may comprise one or more types of bus technologies. The bus network implements a transaction set comprising a plurality of defined transactions that can be communicated over the bus network. Each transaction comprises a request/response pair or a set of request/response pairs.

In the particular implementation, the transaction set includes cache transaction primitives. One of the system components coupled to the bus network is a central processing unit (CPU). Among other features, the CPU includes a cache management or memory management unit that allows the CPU to cache instructions and data from main memory. Modules, devices and sub-components coupled to the bus network use the cache transactions to cause the CPU to perform cache management activities on their behalf. In this manner, when a module desires to access main memory directly, cache coherency can be ensured by issuing a cache transaction prior to the direct memory access. In the preferred implementation, these cache transactions are interpreted by the CPU as explicit commands.

Figure 1:
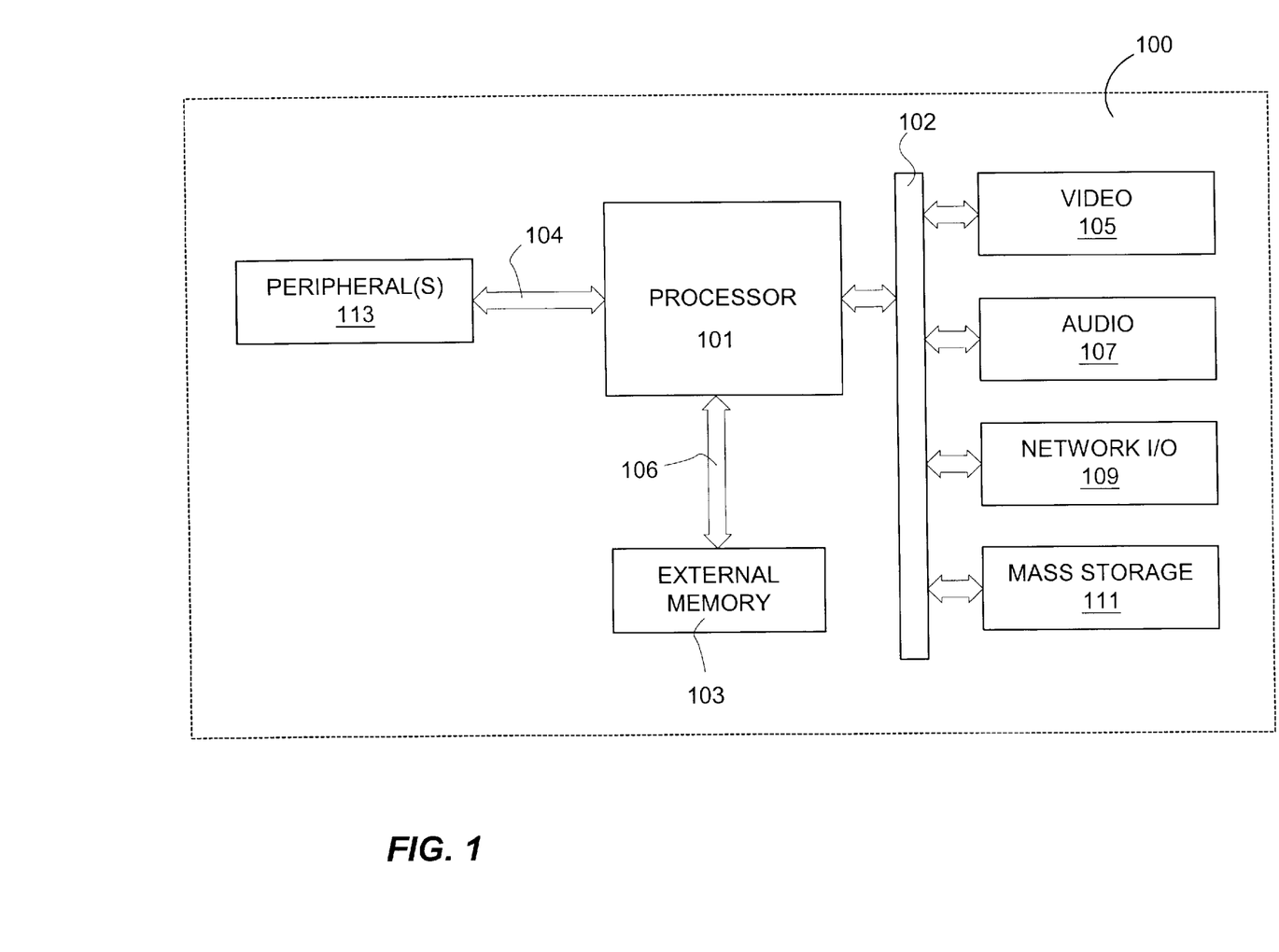
FIG. 1 shows in block diagram form a computer system incorporating an apparatus and system in accordance with the present invention.

Any system is usefully described as a collection of processes or modules communicating via data objects or messages as shown in FIG. 1. The modules may be large collections of circuitry whose properties are somewhat loosely defined, and may vary in size or composition significantly. The data object or message is a communication between modules that make up the system. To actually connect a module within the system it is necessary to define an interface between the system and the component module.

The present invention is illustrated in terms of a media system 100 shown in FIG. 1. The present invention supports systems requiring a number of components that use and benefit from direct memory access, such as media system 100. Media processor 100 comprises, for example, a "set-top box" for video processing, a video game controller, a digital video disk (DVD) player, and the like. Essentially, system 100 is a special purpose data processing system targeted at high throughput multimedia applications, Features of the present invention are embodied in processor 101 that operates to communicate and process data received through a high speed bus 102, peripheral bus 104, and memory bus 106.

Video controller 105 receives digital data from system bus 102 and generates video signals to display information on an external video monitor, television set, and the like. The generated video signals may be analog or digital. Optionally, video controller may receive analog and/or digital video signals from external devices as well. Audio controller 107 operates in a manner akin to video controller 105, but differs in that it controls audio information rather than video. Network I/O controller 109 may be a conventional network card, ISDN connection, modem, and the like for communicating digital information. Mass storage device 111 coupled to high speed bus 102 may comprise magnetic disks, tape drives, CDROM, DVD, banks of random access memory, and the like. A wide variety of random access and read only memory technologies are available and are equivalent for purposes of the present invention. Mass storage 111 may include computer programs and data stored therein.

In a particular example, high speed bus 102 is implemented as a peripheral component interconnect (PCI) industry standard bus. An advantage of using an industry standard bus is that a wide variety of expansion units such as controller's 105, 107, 109 and 111 are readily available. PCI bus 102 supports direct memory access components using a snooping protocol.

Peripherals 113 include a variety of general purpose I/O devices that may require lower bandwidth communication than provided by high speed bus 102. Typical I/O devices include read only memory (ROM) devices such as game program cartridges, serial input devices such as a mouse or joystick, keyboards, and the like. Processor 101 includes corresponding serial port(s), parallel port(s), printer ports, and external timer ports to communicate with peripherals 113. Additionally, ports may be included to support communication with on-board ROM, such as a BIOS ROM, integrated with processor 101. External memory 103 is typically required to provide working storage for processor 101 and may be implemented using dynamic or static RAM, ROM, synchronous DRAM, or any of a wide variety of equivalent devices capable of storing digital data in a manner accessible to processor 101.

Figure 2:
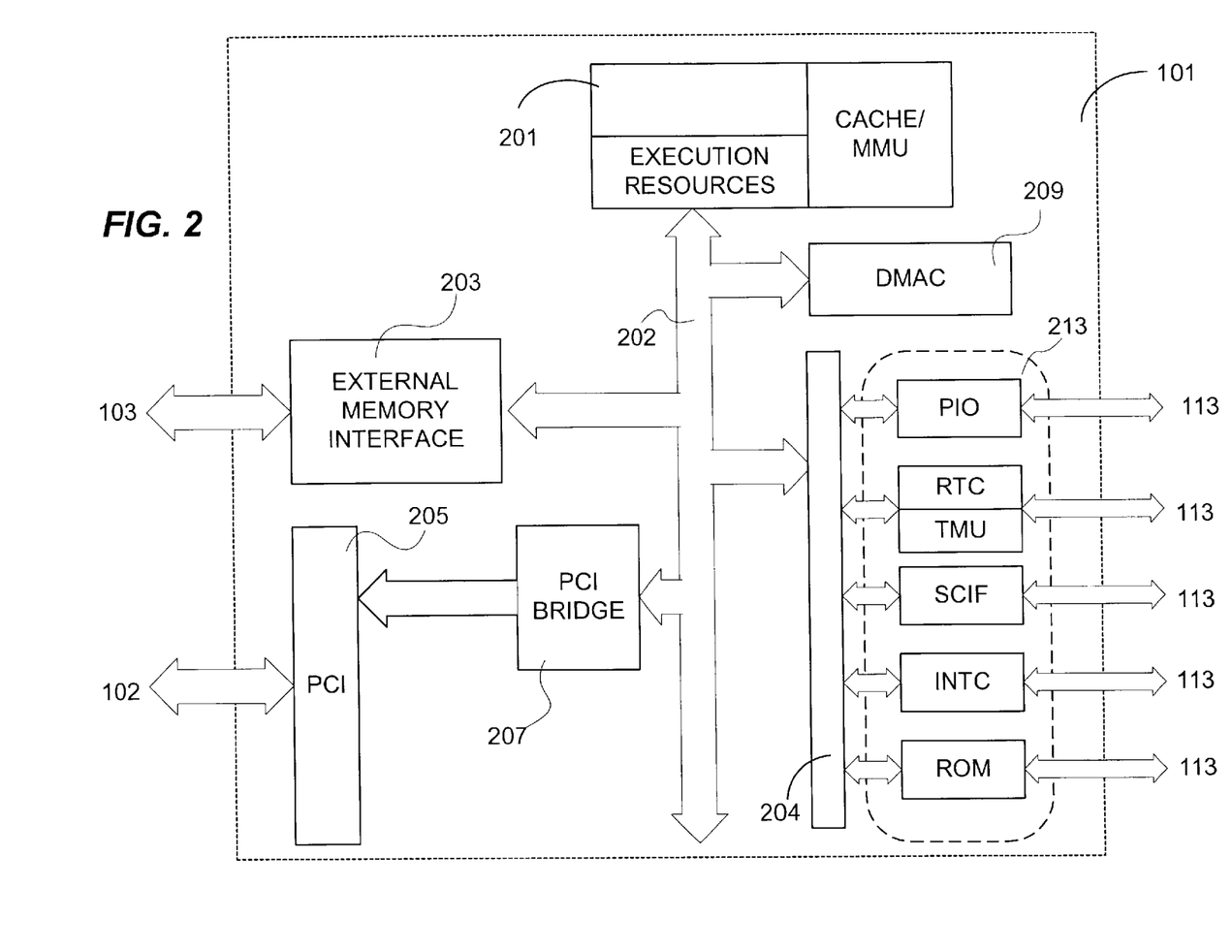
FIG. 2 shows a processor in block diagram form incorporating the apparatus and method in accordance with the present invention.

Processor 101 is illustrated in a greater detail in the functional diagram of FIG. 2. One module in a data processing system is a central processor unit (CPU) core 201. The CPU core 201 includes, among other components (not shown), execution resources (e.g., arithmetic logic units, registers, control logic) and cache memory. These functional units, discussed in greater detail below, perform the functions of fetching instructions and data from memory, preprocessing fetched instructions, scheduling instructions to be executed, executing the instructions, managing memory transactions, and interfacing with external circuitry and devices.

CPU core 201 communicates with other components shown in FIG. 2 through a system bus 202. In the preferred implementation, system bus 202 is a proprietary, high-speed network bus using packet technology and is referred to herein as a "super highway". Bus 202 couples to a variety of system components including the direct management access controller (DMAC) 209. Of particular importance are components that implement interfaces with external hardware such as external memory interface unit 203, PCI bridge 207, and peripheral bus 204. Each component coupled to bus 202 may be a target of a transaction packet on bus 202 as specified by an address within the transaction packet.

External memory interface 203 provides an interface between the system bus 202 and the external main memory subsystem 103 (shown in FIG. 1). The external memory interface comprises a port to system bus 202 and a DRAM controller. An important feature of the present invention is that the memory accessed through external memory interface 203 is coherent as viewed from the system bus 202. All requests are processed sequentially on external memory interface 203 in the order of receipt of those requests by EMI unit 203. However the corresponding Store response packets may not be returned to the initiator on system bus 202 until the write operations are actually completed to DRAM. Since all the requests to the same address are processed in order (as they are received from the SuperHyway interface) on the DRAM interface, the coherency of the memory is achieved.

The organization of interconnects in the system illustrated in FIG. 2 is guided by the principle of optimizing each interconnect for its specific purpose. The bus system 202 interconnect facilitates the integration of several different types of sub-systems. It is used for closely coupled sub-systems which have stringent memory latency/bandwidth requirements. The peripheral subsystem 204 supports bus standards which allow easy integration of hardware of types indicated in reference to FIG. 1 through interface ports 213. PCI bridge 207 provides a standard interface that supports expansion using a variety of PCI standard devices that demand higher performance than available through peripheral port 204. The system bus 202 may be outfitted with an expansion port which supports the rapid integration of application modules without changing the other components of system 101.

It should be noted that in the system of the present invention, the PCI bridge 207 is not coupled directly to CPU core 201 and so cannot support snooping in the conventional manner specified by the PCI standards. Instead, system bus 202 provides a protocol in accordance with the present invention that maps cache commands from, for example PCI bridge 207 onto a cache transaction within the transaction set of bus 202. CPU core 201 responds to the cache transaction by implementing the expected cache command.

Figure 3:
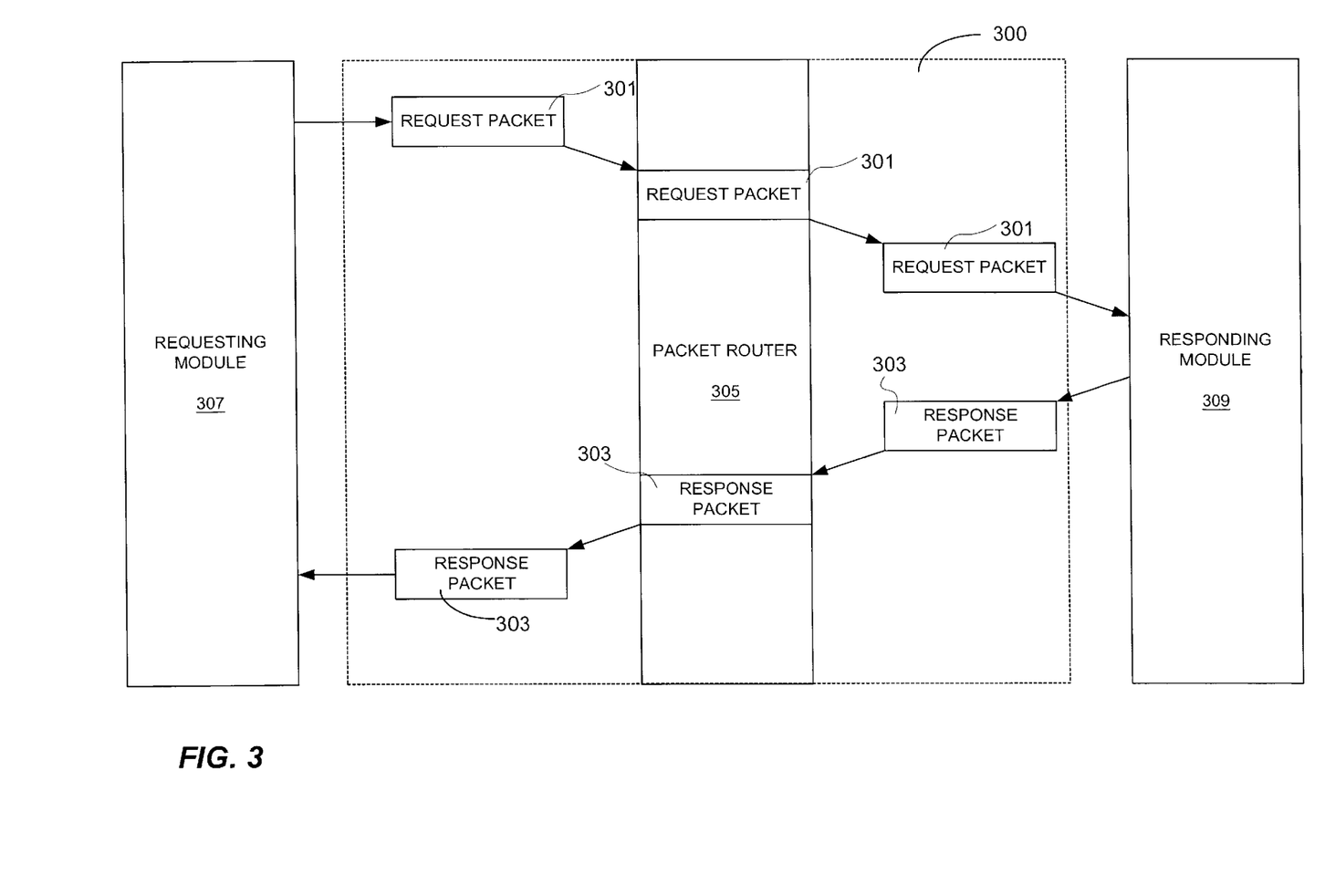
FIG. 3 illustrates a bus transaction in accordance with the present invention.

FIG. 3 illustrates an exemplary transaction 300 comprising a request packet 301 and a response packet 303 for communication across superhighway 202. Packets 301 and 303 comprise a unit of data transfer through the packet-router 305. Communication between modules 307 and 309 is achieved by the exchange of packets between those modules. Each module 307 and 307 is assigned or negotiates with packet router 305 for a unique address. In the particular example, each address is an unsigned integral value that corresponds to a location in the physical memory space of processor 201. Some of the address bits indicate the destination module and some of the address bits (called "offset bits") indicate a particular location within that destination module. The size of the physical address, the number of destination bits, and the number of offset bits are implementation dependent and selected to meet the needs of a particular implementation.

Packet router 305 uses the destination bits to perform routing. Packet router 305 inspects the destination bits of a received packet, determines the appropriate port to which the packet is to be routed, and routes the packet to the specified module. Packet router 305 may be implemented as a bus, crossbar, packet routing network, or equivalent packet transport mechanism to meet the needs of a particular application.

A packet comprises a plurality of fields indicating information such as the type of transaction, target address of the transaction, and/or data needed or produced by the transaction. Each field has a number of possible values to characterize that packet. Every packet contains a destination field which is used by packet router 305 to determine which module the packet should be routed to. In the particular implementation, every packet has a class and a type. A packet's class is either a request or a response. A response packet class is subdivided into either an ordinary response or an error response. A packet's type indicates the kind of transaction associated with that packet. The packet class and type together form a packet opcode.

Each packet is associated with a source module and a destination module. The source sends a packet 301 or 303 over a port into a packet-router 305 within bus 202. Packet-router 305 arranges for the packet to be routed to a p-port connected to the destination. The destination then receives this packet over that p-port from the packet-router. It is possible for the source and destination to be the same nodule. It is also possible for a packet to be decomposed into multiple "cells" where each cell of the packet has the same source and destination module and same packet type. The multiple cells are combined into a packet at the destination.

A "transaction" 300, suggested by the dashed line box in FIG. 3, is an exchange of packets that allows a module to access the state of another module using the super highway bus 202. A transaction comprises a transfer of a request packet 301 from a requesting module 307 (also called an "initiator") to a responding module 309 (also called a "target"), followed by a response packet 303 from that responding module 309 back to the requesting module 307. The request packet 301 initiates the transaction and its contents determine the access to be made. The response packet 303 completes the transaction and its contents indicate the result of the access. A response packet 303 may also indicate whether the request was valid or not. The response packet 303 can be formatted as an ordinary response if the request was valid or an error response if the request was invalid.

In the preferred implementation there is a 1:1 correspondence between request and response packets. The transaction protocol in the preferred implementation is "split phase"

because the request packet 301 and response packet 303 are asynchronous with respect to each other. Requests can be pipelined in that a requesting module 307 can generate multiple request packets 301 before any response packets 303 are received so as to overlap latencies associated with transactions.

Responding 309 modules process requests in the order received, and do not generate a response packet 303 until the requested action is committed. In this manner, apart from internal latency inside the destination module, the access is completed as viewed by all modules coupled to bus 202 when a request packet 301 is received. Any subsequently received requests to that target module will act after that access. This guarantees that time-ordering of access at a destination can be imposed by waiting for the corresponding response.

One of the packet types of particular importance to the present invention is a cache coherency packet type associated with a cache coherency transaction. Cache coherency transactions include a "flush" and a "purge" transaction. These are provided primarily to support the integration of DMA type modules such as PCI bridge 207 shown in FIG. 2, but more generally support any module that uses main memory provided through external memory interface 203.

The flush transaction has a single operand which is the physical address which is to be flushed from the cache. When a flush transaction is received from bus 202 by the cache/MMU within CPU core 201 it causes the cache/MMU to lookup the address in the cache. If the lookup yields a miss or a hit to a cache line that is unmodified with regard to main memory, the cache/MMU issues a response to the flush request immediately following the lookup. If the lookup yields a hit to a cache line that is modified with regard to main memory, the cache controller causes a writeback of the specified line to main memory. Following the writeback the cache/MMU issues a response to the flush request. The response generated by the cache/MMU in either case is a simple acknowledgement that does not carry any data indicating that main memory and cache are cohered.

The purge transaction has a single operand which is the physical address which is to be purged from the cache. When a purge transaction is received from bus 202 by the cache/MMU within CPU core 201 it causes the cache/MMU to lookup the address in the cache. If the lookup yields a miss the cache/MMU issues a response to the purge request immediately following the lookup. If the lookup yields a hit to the cache line modified with regard to main memory, the cache controller causes a writeback of the specified line to main memory. If the lookup yields a hit the cache line is invalidated whether or not the line is modified with respect to main memory. Following the invalidation the cache/MMU issues a response to the purge request. The response generated by the cache/MMU in either case is a simple acknowledgement that does not carry any data indicating that main memory and cache are cohered and that the specified memory location is no longer valid in the cache.

The use of flush and purge by a module provides a level of cache coherency. These operations guarantee that a read operation by a module to an address in a shared memory system will receive the value last written to that address. The time of access is given as the time at which the flush is received by the cache controller. The module read operation is guaranteed to get a data value coherent with the value of the system memory no earlier than the time of access. In the case of a write operation by a module to an address in shared memory, the purge operation guarantees that the written data is readable by all memory users after the time of access. The time of access is given as the time at which the write operation is performed to system memory following the purge of the data cache(s).

In a typical operation, a component coupled to PCI bus 205 wishes to access a shared memory location, it asserts the memory request using PCI standard DMA signaling protocol to PCI bridge 207. Because CPU core 201 is not coupled to the PCI bus 205 directly, this signaling protocol is not recognized by CPU core 201. Although the operation in accordance with the present invention is described with particular reference to PCI module 207, it should be understood that any module coupled to bus 202 that desires to use shared memory can implement the steps outlined below.

Figure 4:
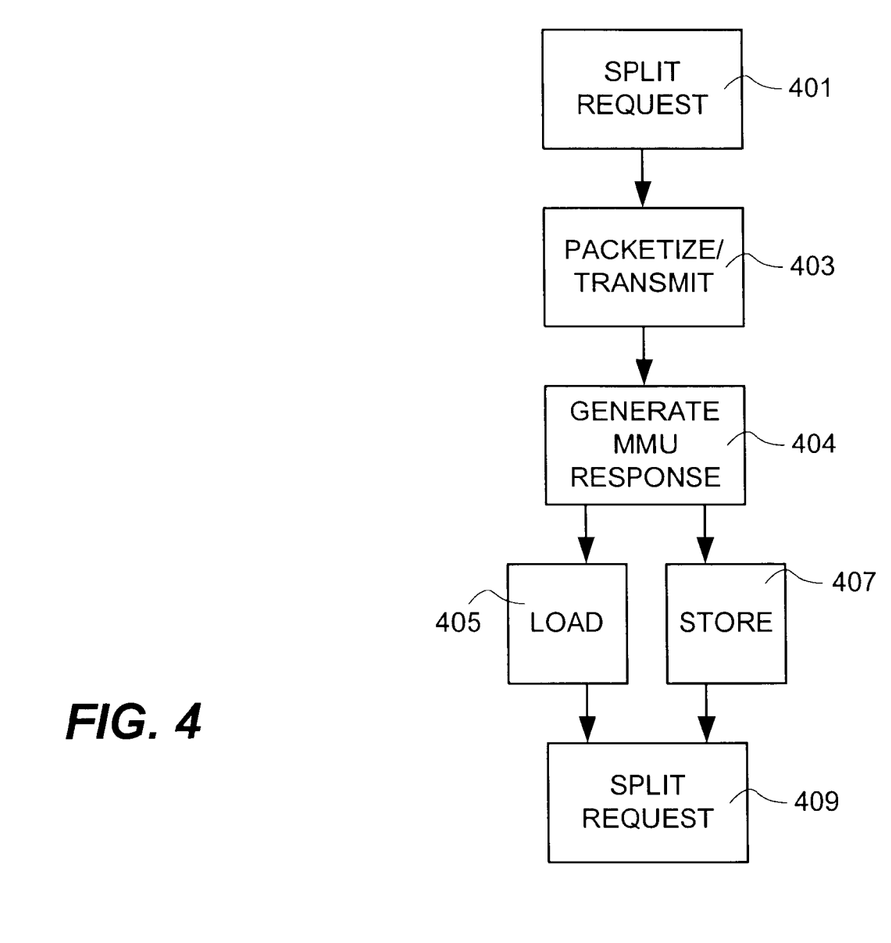
FIG. 4 shows a flow diagram illustrating shared memory access operation in accordance with the present invention.

When PCI module 207 wishes to complete the coherent request to shared memory, module 207 performs the steps shown generally in FIG. 4. In step 401 the module splits up the memory request into a plurality of non-cache line straddling system interconnect requests. In this manner each request is ensured of affecting a single cache line and the cache/MMU does not need to implement special behavior to recognize and implement cache straddling requests. Both flush requests and purge requests are packetized and addressed to a port associated with cache/MMU in CPU core 201 in step 403. The requesting module then waits to receive a response from the cache/MMU in step 404.

For a read operation from shared memory, a load request is then made in step 405 in a packet addressed to the memory interface unit 203. In the case of a write operation, a store request packet is addressed to memory interface unit 203 in step 407. In step 409 external memory interface unit generates a response packet indicating completion of the coherent access.

In this manner the present invention provides cache control instructions that are integrated into the basic transaction set of bus 202. This feature enables any module coupled to bus 202 to implement cache control and ensure coherent use of shared memory resources. Corresponding logic in the cache/MMU of CPU core 201 responds to the cache control transactions to perform the cache control operation on behalf of the requesting module.

The coherency logic within the requesting module (e.g., PCI bridge 207 preferably can specify one or more caching windows and allow remote specification of the caching policy for a particular region in cache to increase coherency performance. This is implemented by providing control register space 501, shown in FIG. 5, that specifies a snoop policy or mode and an address range for snooping. Snoop address register 601 (shown in FIG. 6) within PCI module 207 stores one or more addresses. Both snoop control register 501 and snoop address register 601 have any number of lines specifying any number of cache regions with different snoop policies. Each snoop control register has a corresponding snoop address register.

In the particular implementation a 2-bit mode field indicates whether and how the address in a PCI request is compared to the address stored in the snoop address register. An example encoding is summarized in Table 1.

TABLE 1

| | |
|---|---|
| 00 | Snoop address register is not compared |
| 01 | Reserved |
| 10 | Address is compared, and upon a match the snoop command is not issued. Upon a miss, snoop command is issued |

TABLE 1-continued

| | |
|---|---|
| 11 | Address is compared, and upon a match the snoop command is issued. Upon a miss, snoop command is not issued. |

Figure 6:
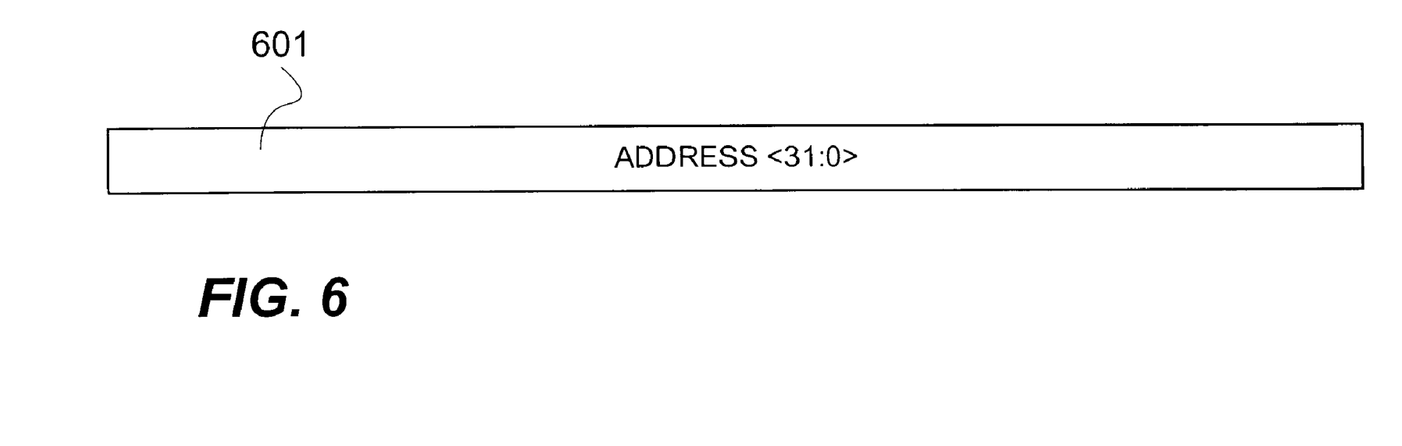
FIG. 6 illustrates an exemplary snoop address register format in accordance with the present invention.

The range field has eight possible values in the particular implementation with each value indicating a range of addresses that will result in a match during the comparison of the memory address in the PCI request and the stored snoop address in register 601. Essentially, each value of the range field indicates how many bits of the stored snoop address will take part in the comparison. Table 2 summarizes an exemplary encoding.

TABLE 2

| Value | Interpretation | Range |
|---|---|---|
| 000 | Compare address bits 31:12 | 4 kB |
| 001 | Compare address bits 31:16 | 64 kB |
| 010 | Compare address bits 31:20 | 1 MB |
| 011 | Compare address bits 31:24 | 16 MB |
| 100 | Compare address bits 31:25 | 32 MB |
| 101 | Compare address bits 31:26 | 64 Mb |
| 110 | Compare address bits 31:27 | 128 MB |
| 111 | Compare address bits 31:28 | 256 MB |

Figure 5:
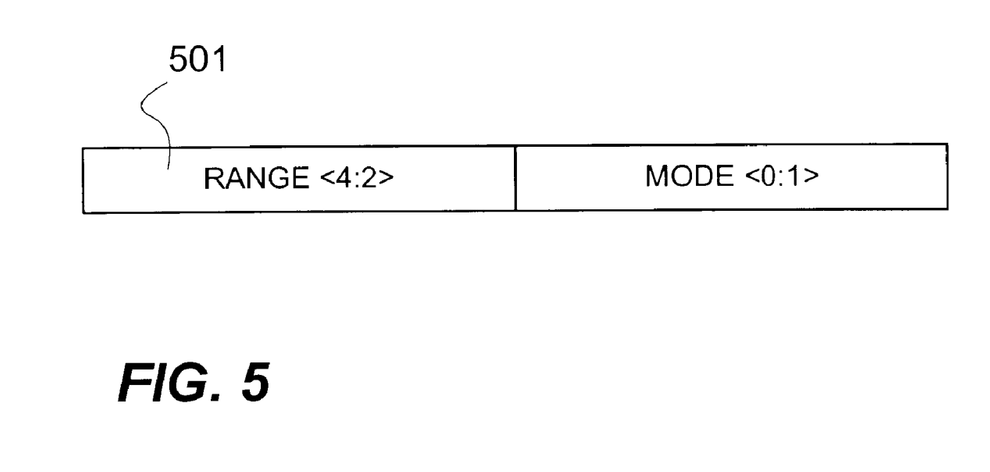
FIG. 5 illustrates an exemplary control register format in accordance with the present invention.

The actual encoding and range sizes as well as the number of discrete ranges that are enabled are a matter of design choice selected to meet the needs of a particular application. In this manner, a cache partition can be implemented by storing an address within a snoop address register 601 with the size of the partition specified by a value stored in the range field of snoop control register 501. The cache coherency policy for that partition can be controlled by setting the value in the corresponding mode field of snoop control register 501. This feature of the present invention enables the remote specification of the caching policy in a manner that does not require any manipulation of control registers within CPU core 201. Whether or not a flush or purge command is issued is determined by the PCI module 207 and the cache/MMU within CPU core 201 merely responds to execute and acknowledge issued cache control commands.

To implement the above feature, PCI module 207 will precede step 401 in FIG. 4 with a step of checking whether the shared memory address requested matches an address specified in the snoop address register 601 within the bounds specified by the snoop control register 501. The stored addresses may indicate that a snoop is to be performed, in which case the process proceeds to step 401. Alternatively, when a snoop is not to be performed the process will proceed to steps 405 and 407 accordingly.

The implementation described above can be extended by adding additional bits to the mode field. For example, a particular implementation may implement an optimization based on cache policy. For each defined snoop range a single bit can be used to indicate a selection between two optional behaviors. For example, each snoop range can be assigned a policy of "flush on read, purge on write" or "nothing on read, purge on write". A single bit in the mode field can allow the choice of policy independently for each cache region. This optional feature reduces the number of unnecessary coherency transactions. Specifically, when the CPU caching policy is write-through then there is no possibility of dirty data existing in the cache and so remote-initiated flushes are redundant. The optimization enables these redundant operations to be avoided.

While the invention has been particularly shown and described with reference to a preferred embodiment thereof, it will be understood by those skills in the art that various other changes in the form and details may be made without departing from the spirit and scope of the invention. The various embodiments have been described using hardware examples, but the present invention can be readily implemented in software. For example, it is contemplated that a programmable logic device, hardware emulator, software simulator, or the like of sufficient complexity could implement the present invention as a computer program product including a computer usable medium having computer readable code embodied therein to perform precise architectural update in an emulated or simulated out-of-order machine. Accordingly, these and other variations are equivalent to the specific implementations and embodiments described herein.

What is claimed is:

1. A computer system comprising:

a memory system where at least some of the memory is designated as shared memory;

a transaction-based bus mechanism coupled to the memory system wherein the bus mechanism includes a cache coherency transaction defined within its transaction set;

a processor having a cache memory, the processor coupled to the memory system through the transaction based bus mechanism;

a system component coupled to the bus mechanism, the system component including logic for specifying cache coherency policy;

logic within the system component for initiating a cache transaction according to the specified cache policy on the bus mechanism; and logic within the processor responsive to the initiated cache transaction for executing a cache operation specified by the cache transaction.

2. The computer system of claim 1 further comprising logic within the system component for defining two or more cache partitions having independent cache policies specified for each partition.

3. The computer system of claim 2 wherein the logic for defining two or more cache partitions comprises:

a first register having an entry for each defined cache partition, each entry holding a reference memory address;

a second register having an entry holding a value indicating a size of a range of addresses around the reference memory addresses that comprise each cache partition.

4. The computer system of claim 1 further comprising logic within the processor for generating a response addressed to the system component on the bus mechanism wherein the response acknowledges completion of the cache operation.

5. The computer system of claim 1 wherein the logic for specifying cache coherency policy comprises:

a first register having an entry holding a reference memory address;

a second register having an entry holding a value indicating the specified cache policy for any cache line representing the reference memory address in the cache memory.

6. The computer system of claim 5 wherein the logic for specifying cache coherency policy further comprises a third register having an entry holding a value indicating a range of memory addresses about the reference memory address to which the specified cache policy applies.

7. A method for managing a cache memory accessible by a processor, the method comprising:
   specifying a cache coherency policy in a remote system component;
   coupling the remote system component to the processor using a transaction-based system bus;
   initiating a cache coherency transaction according to the specified coherency policy using the remote system component, the cache coherency transaction being transmitted to the processor on the system bus; and
   in response to the initiated cache coherency transaction, causing the processor to perform a cache coherency operation specified by the cache coherency transaction.

8. The method of claim 7 further comprising a step of defining two or more cache partitions having independent cache policies specified for each partition.

9. The method of claim 7 further comprising generating a response message using the processor after the cache coherency operation is performed, the response being addressed to the remote system component.

10. The method of claim 7 further comprising:
    storing a reference memory address in the remote system component;
    storing a value indicating the specified cache policy in the remote system component, wherein the value indicates the cache policy for a cache line including the reference memory address.

11. The method of claim 10 further comprising:
    storing in the remote system component a value indicating a range of addressees about the reference memory address to which the specified cache policy applies.

12. A component for a computer system having a cache memory accessible through a data processor, the component comprising:
    an interface for coupling to a system bus to communicate with the data processor and external memory;
    logic for specifying cache coherency policy; and
    logic for initiating a cache transaction according to the specified cache policy on the bus mechanism, wherein the initiating logic is configured such that the cache transaction is initiated prior to any corresponding direct access to the external memory.

13. The component of claim 12 further comprising logic defining two or more cache partitions having independent cache policies specified for each partition.

14. A component for a computer system having a cache memory accessible through a data processor, the component comprising:
    an interface for coupling to a system bus to communicate with the data processor;
    logic for specifying cache coherency policy wherein the logic for specifying cache coherency policy further comprises:
        a first register having an entry holding a reference memory address;
        a second register having an entry holding a value indicating the specified cache policy for any cache line representing the reference memory address in the cache memory; and
    logic for initiating a cache transaction according to the specified cache policy on the bus mechanism.

15. The component of claim 12, wherein the specifying logic selects the cache coherency policy from a transaction set of cache transaction primitives.

16. The component of claim 15, wherein the specifying logic and the initiating logic are adapted to process requests to a single address in the external memory in an order of receipt from the interface.

17. A data processor comprising:
    a cache memory;
    an interface to a system bus; and
    a cache control mechanism responsive to cache commands received on the system bus from the interface to map the cache commands onto a cache transaction selected from a transaction set, wherein the cache commands are processed sequentially in order of receipt.

18. The data processor of claim 17, wherein the transaction set includes flush and purge cache transactions.

19. The data processor of claim 17, further including a core adapted to respond to the mapped cache transaction by implementing the cache commands.

* * * * *